United States Patent
Fukuoka et al.

(10) Patent No.: US 7,300,723 B2
(45) Date of Patent: Nov. 27, 2007

(54) HEAT RESISTANT LITHIUM CELL

(75) Inventors: Satoru Fukuoka, Sumoto (JP); Seiji Morita, Sumoto (JP); Nobuhiro Nishiguchi, Sumoto (JP); Satoru Naruse, Sumoto (JP); Masayuki Muraki, Hyogo (JP); Masahiro Imanishi, Susono (JP)

(73) Assignee: Sanyo Electric Co., Ltd., Osaka (JP)

( * ) Notice: Subject to any disclaimer, the term of this patent is extended or adjusted under 35 U.S.C. 154(b) by 646 days.

(21) Appl. No.: 10/785,970

(22) Filed: Feb. 26, 2004

(65) Prior Publication Data

US 2004/0170903 A1 Sep. 2, 2004

(30) Foreign Application Priority Data

Feb. 28, 2003 (JP) ............................. 2003-054475
Sep. 30, 2003 (JP) ............................. 2003-340864

(51) Int. Cl.
*H01M 6/16* (2006.01)
(52) U.S. Cl. .................. 429/326; 429/341; 429/330; 429/333
(58) Field of Classification Search ................ 429/326, 429/330, 341, 333
See application file for complete search history.

(56) References Cited

U.S. PATENT DOCUMENTS

| | | | |
|---|---|---|---|
| 5,154,992 A | 10/1992 | Berberick et al. | |
| 6,623,892 B1 | 9/2003 | Yamaguchi et al. | |
| 6,881,522 B2 | 4/2005 | Hamamoto et al. | |
| 2004/0096750 A1* | 5/2004 | Kim et al. | 429/326 |
| 2004/0142247 A1* | 7/2004 | Yoshimura et al. | 429/333 |

FOREIGN PATENT DOCUMENTS

| | | |
|---|---|---|
| CN | 1278664 A | 1/2001 |
| JP | 1-281677 | 11/1989 |
| JP | 08-321311 | 12/1996 |
| JP | 9-147910 | 6/1997 |
| JP | 2002-298911 | 10/2002 |
| WO | WO 02/15319 A1 | 2/2002 |

* cited by examiner

*Primary Examiner*—Laura Weiner
(74) *Attorney, Agent, or Firm*—Westerman, Hattori, Daniels & Adrian, LLP.

(57) ABSTRACT

The present invention provides a cell that does not impair heat resistant safety and electrochemical characteristics such as a discharge characteristic, and enhances long-period reliability. In the cell of the present invention, a nonaqueous solvent has, among compounds represented by the following general formula (1), at least one solvent having a boiling point of 200° C. or higher, and has, among compounds represented by the following general formula (1), at least one solvent having a boiling point of lower than 200° C.; and the total volume ratio at 23° C. of the compounds represented by the following general formula (1) is 95 to 100 percent of the nonaqueous solvent, $$X-(O-C_2H_4)n-O-Y \quad (1)$$

(where X and Y are independently an alkyl group (number of carbons: 1-4), and n is 1-5).

8 Claims, 2 Drawing Sheets

HEAT RESISTANT LITHIUM CELL

BACKGROUND OF THE INVENTION (1) Field of the Invention

The present invention relates to an improvement of an electrolyte of lithium cells.

(2) Description of the Prior Art

Conventional lithium cells can be used in a temperature environment of up to approximately 85° C. However, when lithium cells are incorporated into electrical components of vehicles (air-pressure gauges for tires, on-vehicle devices of the Electronic Toll Collection system, and the like), FA (Factory Automation) appliances, and the like, the cells are often exposed to a harsh temperature environment of over 100 to 150° C.

To enhance productivity, when the cells are incorporated into electronic appliances, the technique of reflow soldering is employed. With this technique, a cell temperature reaches, though only temporarily, as high as 200 to 260° C. In view of this, there is a need for highly reliable lithium cells in heat resistivity that do not swell or do not deteriorate their cell characteristics under such harsh temperature environment.

As a technique to enhance safety of secondary lithium cells, there is proposed a technique in which diethylene glycol dimethyl ether or triethylene glycol dimethyl ether is used as a main solvent of an electrolytic solution (Japanese Unexamined Patent Publication No. H1-281677).

As a technique to enhance the discharge characteristic of secondary lithium cells and to impart high temperature resistivity thereto, there is proposed a technique in which the main solvent of the electrolytic solution is butyl diglyme (diethylene glycol dibutyl ether), which has a high boiling point, and a separator and a gasket used are made of polyphenylene sulfide, which is heat resistant resin (Japanese Unexamined Patent Publication No. 2002-298911).

There is also proposed a technique in which carboxylic acid or carboxylic acid ester is added in a nonaqueous electrolyte (Japanese Unexamined Patent Publication Nos. H8-321311 and H9-147910).

However, with the technique disclosed in H1-281677, heat resistivity is insufficient because the separator and gasket used here are made of low heat-resistant polypropylene (melting point: approximately 150° C.). For this reason, the cells cannot be used in the above fields of application, where a long period of stability against temperatures of near 150° C. is required, and also cannot be used in reflow soldering, where a cell is exposed to temperatures of at least 200° C.

With the technique disclosed in 2002-298911, although heat resistivity is excellent, the viscosity of the nonaqueous electrolytic solution is high because the main solvent is the highly viscous butyl diglyme (diethylene glycol dibutyl ether). This lowers the ionic conductivity of the electrolytic solution, resulting in a poor discharge characteristic.

With the technique disclosed in H8-321311, a cell is provided with a nonaqueous electrolytic solution in which at least one solvent of high dielectric constant selected from the group consisting of ethylene carbonate, propylene carbonate, and butylene carbonate, and 1,2-dimethoxyethane are mixed at a volume ratio of 3:7 to 7:3. However, the solvent of high dielectric constant reacts with the negative electrode under a condition of high temperature and forms a highly resistant coating film on the surface of the negative electrode. This reaction occurs conspicuously in a condition of high temperature, and since the solvent of high dielectric constant is contained at a high ratio of 30 volume percent or higher, the amount of the formed coating layer is excessive. Since internal cell resistance increases due to this coating film, the cell cannot be used in the above fields of application, where a long period of stability against temperatures of near 150° C. is required, and also cannot be used in reflow soldering, where a cell is exposed to temperatures of at least 200° C.

With the technique disclosed in H9-147910, the nonaqueous electrolytic solution used is a nonaqueous solvent in which at least one cyclic carbonic acid ester of high viscosity selected from the group consisting of ethylene carbonate, propylene carbonate, butylene carbonate, and vinylene carbonate, and dimethyl carbonate, diethyl carbonate, or methyl ethyl carbonate are mixed at a volume ratio of approximately 1:1. Here, the same problem arises as the technique of H8-321311. Accordingly, the cell cannot be used in the above fields of application, where a long period of stability against temperatures of near 150° C. is required, and also cannot be used in reflow soldering, where a cell is exposed to temperatures of at least 200° C.

SUMMARY OF THE INVENTION

In view of the foregoing and other problems in prior art, it is an object of the present invention to provide a lithium cell that is excellent in heat resistant safety (a long period of stability against temperatures of near 150° C., and usability for reflow soldering, where a cell is exposed to temperatures of at least 200° C.) and in a discharge characteristic.

(a) In order to accomplish the above object, a lithium cell according to the present invention comprises a positive electrode, a negative electrode, a separator interposed between the positive electrode and the negative electrode, and a nonaqueous electrolyte including a nonaqueous solvent and an electrolytic salt, the cell wherein: the nonaqueous solvent has, among compounds represented by the following general formula (1), at least one compound having a boiling point of 200° C. or higher, and has, among compounds represented by the following general formula (1), at least one compound having a boiling point of lower than 200° C.; and a total volume ratio at 23° C. of the compounds represented by the following general formula (1) is 95 to 100 percent of the nonaqueous solvent,

X—(O—C$_2$H$_4$)n-O—Y  (1)

(where X and Y are independently an alkyl group (number of carbons: 1-4), and n is 1-5).

According to the above construction, among compounds (there are cases where they are referred to as ether-based compounds) represented by the above general formula (1), a compound having a boiling point of lower than 200° C. has relatively low viscosity. When this compound is included in the electrolytic solution, the conductivity of a lithium ion improves and thus the internal cell resistivity decreases, making it possible to improve cell characteristics.

However, since the boiling point of the above compound is lower than 200° C., at the time of reflow soldering, where a cell is exposed to temperatures of 200 to 260° C., a portion of the compound volatilizes and thus internal cell pressure increases. This may cause the swelling of the cell. However, according to the above construction, among compounds represented by the above general formula (1), a compound having a boiling point of 200° C. or higher is included. Although having high viscosity, this compound is excellent in heat stability and thus operates to alleviate an increase in internal cell pressure at the time of reflow soldering, which increase results from the compound having a boiling point of lower than 200° C. As a result, the swelling of the cell is rendered small.

The above ether-based compound is extremely less reactive to the electrodes than cyclic carbonate such as ethylene carbonate and propylene carbonate is, which was conventionally used. As a result, a lithium cell excellent in heat resistant safety and a discharge characteristic is realized.

Note that the volume mixture ratio in the present specification is that measured under the conditions of 23° C. and 1 atm.

(b) In the lithium cell of a first preferred embodiment according to the present invention, among compounds represented by the above general formula (1), the compound having a boiling point of lower than 200° C. may include 1,2-dimethoxyethane, and a volume ratio of the compound having a boiling point of lower than 200° C. may be 50 to 60 percent of the total volume at 23° C. of the compounds represented by the above general formula (1), Among the compounds that meet the above general formula (1), the compound having the lowest boiling point is one in which n is the smallest and the carbons in X and Y are the smallest as well. That is, among the compounds that meet the above general formula (1), the compound having the lowest boiling point is 1,2-dimethoxyethane (DME), in which n=1 and X and Y are composed of a methyl group.

The critical temperature of 1,2-dimethoxyethane (DME), which is the compound having the lowest boiling point, is 258° C., and if the volume ratio of a compound having a boiling point of lower than 200° C. and including DME is higher than 60 volume percent of the total volume at 23° C. of the compounds represented by the above general formula (1), internal cell pressure becomes excessive at the time of normal reflow soldering (200-260° C.), even if a compound having a boiling point of higher than 200° C. is mixed. This promotes the swelling of the cell. On the other hand, if the volume ratio is lower than 50 volume percent, internal cell resistivity increases, and thus the effect to improve cell characteristics is insufficient. Accordingly, it is preferable that the volume ratio be restricted within 50 to 60 percent.

(c) In the lithium cell of the first preferred embodiment according to the present invention, among compounds represented by the above general formula (1), the compound having a boiling point of lower than 200° C. may be a compound other than 1,2-dimethoxyethane, and the volume ratio of the compound having a boiling point of lower than 200° C. may be 50 to 90 percent of a total volume at 23° C. of the compounds represented by the above general formula (1), Among compounds represented by the above general formula (1), a compound that is other than 1,2-dimethoxyethane and has a boiling point of lower than 200° C. has a critical temperature of higher than 260° C., and its volume mixture ratio can be rendered higher than when using 1,2-dimethoxyethane alone. However, if the volume mixture ratio is higher than 90 volume percent, internal cell pressure becomes excessive at the time of normal reflow soldering (200-260° C.), even if a compound having a boiling point of higher than 200° C. is mixed. This promotes the swelling of the cell. In addition, if the volume ratio is lower than 50 volume percent, internal cell resistivity increases, and thus the effect to improve cell characteristics is insufficient. Accordingly, it is preferable that the volume ratio be restricted within the above-specified range.

(d) In the lithium cell according to the first preferred embodiment of the present invention, the nonaqueous solvent may include, as a subsidiary component, cyclic ester carbonate and/or lactone. The total of the cyclic ester carbonate and/or lactone is 5 volume percent or lower at 23° C.

The use of cyclic ester carbonate or lactone as a subsidiary component has the following advantage. Since this subsidiary component has high stability under a condition of high temperature and has a higher relative dielectric constant than a compound represented by the above general formula (1), such subsidiary component operates so that a cycle characteristic improves. Accordingly, a cell that is excellent in safety and a discharge characteristic under an environment of high temperature, and has a high cycle characteristic is realized.

However, as described above, these compounds have the problem of reacting with the negative electrode under a condition of high temperature and thus forming a highly resistant coating film. However, since the volume mixture ratio is lower than 5 volume percent or lower of the nonaqueous solvent, the above drawback is restricted to an extremely low level.

(e) In the lithium cell according to the first preferred embodiment of the present invention, the electrolytic salt may be lithium bis (trifluoromethanesulfonyl) imide and/or lithium bis (pentafluoroethanesulfonyl) imide.

The use of imide-based lithium salt as an electrolytic salt has the following advantage. Since these compounds are highly stable electrochemically and thermally, the electrolytic solution does not deteriorate when exposed to a condition of high temperature at the time of reflow soldering. Therefore, with this construction, it is made possible to provide a cell in which deterioration of a discharge characteristic is further inhibited in an environment of high temperature.

(f) In the lithium cell according to first preferred embodiment of the present invention, the nonaqueous electrolyte may include at least one compound selected from the group consisting of carboxylic acid, carboxylic acid ester (excluding lactone), and carboxylic acid anhydride at 0.01 to 5 pts. mass in total per 100 pts. mass of the nonaqueous solvent.

When carboxylic acid, carboxylic acid ester, or carboxylic acid anhydride (there are cases where they are referred to as carboxylic acids and the like) is added as an additive in the nonaqueous electrolyte, this additive reacts with the negative electrode and forms a highly conductive coating film. This coating film causes to inhibit the reaction between an ether-based compound and the negative electrode in a condition of high temperature. As a result, an increase in internal resistance caused by reflow soldering is inhibited, further improving a discharge characteristic.

DESCRIPTION OF THE PREFERRED EMBODIMENTS

Figure 1:
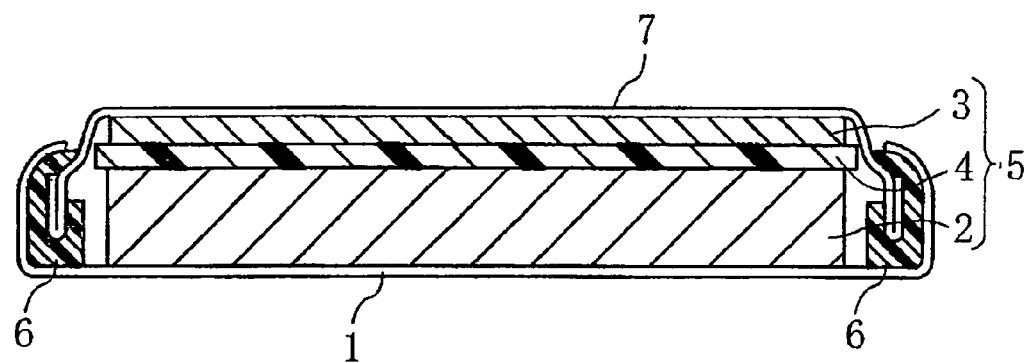
FIG. 1 is a schematic sectional view of a coin type lithium secondary cell according to the present invention.

With reference to the drawing, the preferred embodiments of the present invention will be described in detail with a lithium secondary cell taken as an example. It should be understood that the present invention is not to be limited to the following preferred embodiments, and various changes, modifications, and alterations can be made herein without departing from the scope of the invention. FIG. 1 is a sectional view showing the entire construction of the cell.

Referring to FIG. 1, a lithium secondary cell according to an example of the present invention includes, in a cell outer housing can (positive electrode can) 1, an electrode assembly 5 composed of a positive electrode 2 having spinel type lithium manganese oxide as an active material, a negative electrode having a lithium-aluminum alloy as an active material, and a separator 4 that separates the electrodes. In the separator 4, an electrolytic solution is impregnated. This electrolytic solution is such that lithium salt is dissolved in a nonaqueous solvent that has, among compounds represented by the following general formula (1), at least one compound having a boiling point of 200° C. or higher, and has, among compounds represented by the following general formula (1), at least one compound having a boiling point of lower than 200° C., wherein a total volume ratio of the compounds represented by the following general formula (1) is 95 to 100 percent. This cell is sealed such that the opening portion of the positive electrode can 1 and a cell sealing can (negative electrode cap) 7 are caulked and fixed with the intervention of a ring-shaped insulating gasket 6.

X—(O—C$_2$H$_4$)n-O—Y     (1)

(where X and Y are independently an alkyl group (number of carbons: 1-4), and n is 1-5)

Next, a fabrication method of the lithium secondary cell according to the present invention is described.

[Preparation of Positive Electrode]

Spinel type lithium manganese oxide (LiMn$_2$O$_4$) for serving as a positive-electrode active material, carbon black for serving as a conductant agent, and polyvinylidene fluoride for serving as a binding agent were mixed at a mass ratio of 94:5:1, respectively. This mixture was pressure-molded in order to have a disc-shaped positive electrode pellet of 4 mm across and 0.5 mm thick. This positive electrode pellet was vacuum-dried (at 250° C. for 2 hours) to remove the moisture out the pellet. Thus, a positive electrode was prepared.

[Preparation of Negative Electrode]

The negative electrode cap used here was made of a clad material composed of a stainless plate and an aluminum plate adhered to each other with the aluminum plate facing inside. A metal lithium plate was contact-bonded onto the surface of the aluminum plate, which was the inner surface of the negative electrode cap, in order to prepare a disc-shaped negative electrode of 3.5 mm across and 0.2 mm thick. The metal lithium plate, which was contact-bonded onto the surface of the aluminum plate, has an alloying reaction caused by charging and discharging after the sealing of the cell, and thus the active material of the negative electrode is rendered a lithium-aluminum alloy.

[Preparation of Electrolytic Solution]

In a nonaqueous solvent in which 1,2-dimethoxyethane (DME) and tetraethylene glycol dimethyl ether (TeGM) were mixed at a volume ratio of 50:50, 1.0 M (mole/liter) of LiN (CF$_3$SO$_2$)$_2$ for serving as an electrolytic salt was dissolved to prepare an electrolytic solution.

[Preparation of Cell]

A separator made of a nonwoven fabric of polyphenylene sulfide (PPS) was placed on the negative electrode, and the electrolytic solution was injected into the separator. Then, the positive electrode was placed on the separator, and a positive electrode can of stainless was further placed thereover. The positive electrode can and the negative electrode cap were caulked and sealed with the intervention of an insulating gasket made of polyether etherketone. Thus, a lithium secondary cell with a cell diameter of 6 mm and a thickness of 2 mm was prepared. Note that PPS and polyether etherketone are resins of high heat resistance (melting point, PPS: approximately 280° C.; polyether etherketone: approximately 340° C.).

Next, the present invention will be further detailed by means of examples.

EXAMPLES 1-44 AND COMPARATIVE EXAMPLES 1-9

Cells were prepared in the same manner as the above embodiment except that the kind and compound ratio of the nonaqueous solvent, the kind and added amount of an additive, and the kind of the electrolytic salt were changed as shown in Tables 1-3.

TABLE 1

| | Composition of nonaqueous solvent (vol. %) | | | | | | | | Kind of additive | Added amount (mass %) | Kind of electrolyte |
|---|---|---|---|---|---|---|---|---|---|---|---|
| | Solvent of low boiling point | | | Solvent of high boiling point | | | Subsidiary component | | | | |
| | DME | DGM | DGE | TGM | DGB | TeGM | PC | EC | | | |
| Example 1 | 50 | | | | | 50 | | | | | LiN(CF$_3$SO$_2$)$_2$ |
| Example 2 | | 50 | | | | 50 | | | | | LiN(CF$_3$SO$_2$)$_2$ |
| Example 3 | | | 50 | | | 50 | | | | | LiN(CF$_3$SO$_2$)$_2$ |
| Example 4 | 25 | 25 | | | | 50 | | | | | LiN(CF$_3$SO$_2$)$_2$ |
| Example 5 | 10 | 40 | | | | 50 | | | | | LiN(CF$_3$SO$_2$)$_2$ |
| Example 6 | | 50 | | | 50 | | | | | | LiN(CF$_3$SO$_2$)$_2$ |
| Example 7 | | 50 | | 50 | | | | | | | LiN(CF$_3$SO$_2$)$_2$ |
| Example 8 | | 50 | | | 25 | 25 | | | | | LiN(CF$_3$SO$_2$)$_2$ |
| Example 9 | 10 | 40 | | | 25 | 25 | | | | | LiN(CF$_3$SO$_2$)$_2$ |
| Example 10 | | 50 | | | | 50 | | | | | LiN(C$_2$F$_5$SO$_2$)$_2$ |
| Example 11 | | 50 | | | | 50 | | | | | LiPF$_6$ |
| Example 12 | | 50 | | | | 50 | | | | | LiBF$_4$ |
| Example 13 | 60 | | | | | 40 | | | | | LiN(CF$_3$SO$_2$)$_2$ |
| Example 14 | 70 | | | | | 30 | | | | | LiN(CF$_3$SO$_2$)$_2$ |
| Example 15 | | 30 | | | | 70 | | | | | LiN(CF$_3$SO$_2$)$_2$ |
| Example 16 | | 70 | | | | 30 | | | | | LiN(CF$_3$SO$_2$)$_2$ |
| Example 17 | | 90 | | | | 10 | | | | | LiN(CF$_3$SO$_2$)$_2$ |

TABLE 1-continued

| | Composition of nonaqueous solvent (vol. %) | | | | | | | | Added | |
|---|---|---|---|---|---|---|---|---|---|---|
| | Solvent of low boiling point | | | Solvent of high boiling point | | | Subsidiary component | | Kind of additive | amount (mass %) | Kind of electrolyte |
| | DME | DGM | DGE | TGM | DGB | TeGM | PC | EC | | | |
| Example 18 | 49.5 | | | | | 49.5 | 1 | | | | LiN(CF$_3$SO$_2$)$_2$ |
| Example 19 | 48.5 | | | | | 48.5 | 3 | | | | LiN(CF$_3$SO$_2$)$_2$ |
| Example 20 | 47.5 | | | | | 47.5 | 5 | | | | LiN(CF$_3$SO$_2$)$_2$ |
| Example 21 | 49.5 | | | | | 49.5 | | 1 | | | LiN(CF$_3$SO$_2$)$_2$ |

TABLE 2

| | Composition of nonaqueous solvent (vol. %) | | | | | | | | Kind of additive | Added amount (mass %) | Kind of electrolyte |
|---|---|---|---|---|---|---|---|---|---|---|---|
| | Solvent of low boiling point | | | Solvent of high boiling point | | | Subsidiary component | | | | |
| | DME | DGM | DGE | TGM | DGB | TeGM | PC | EC | | | |
| Example 22 | 49.5 | | | | | 49.5 | 1 | | Ethyl formate | 0.01 | LiN(CF$_3$SO$_2$)$_2$ |
| Example 23 | 49.5 | | | | | 49.5 | 1 | | Ethyl formate | 1 | LiN(CF$_3$SO$_2$)$_2$ |
| Example 24 | 49.5 | | | | | 49.5 | 1 | | Ethyl formate | 5 | LiN(CF$_3$SO$_2$)$_2$ |
| Example 25 | 49.5 | | | | | 49.5 | 1 | | Ethyl formate | 7 | LiN(CF$_3$SO$_2$)$_2$ |
| Example 26 | 49.5 | | | | | 49.5 | 1 | | Ethyl formate | 10 | LiN(CF$_3$SO$_2$)$_2$ |
| Example 27 | 49.5 | | | | | 49.5 | 1 | | formic acid | 1 | LiN(CF$_3$SO$_2$)$_2$ |
| Example 28 | 49.5 | | | | | 49.5 | 1 | | acetic acid | 1 | LiN(CF$_3$SO$_2$)$_2$ |
| Example 29 | 49.5 | | | | | 49.5 | 1 | | oxalic acid | 1 | LiN(CF$_3$SO$_2$)$_2$ |
| Example 30 | 49.5 | | | | | 49.5 | 1 | | ethyl acetate | 1 | LiN(CF$_3$SO$_2$)$_2$ |
| Example 31 | 49.5 | | | | | 49.5 | 1 | | acetic anhydride | 1 | LiN(CF$_3$SO$_2$)$_2$ |
| Example 32 | 49.5 | | | | | 49.5 | 1 | | phthalic anhydride | 1 | LiN(CF$_3$SO$_2$)$_2$ |
| Example 33 | 89 | | | | | 10 | 1 | | | | LiN(CF$_3$SO$_2$)$_2$ |
| Example 34 | 89 | | | | | 10 | 1 | | methyl acetate | 0.1 | LiN(CF$_3$SO$_2$)$_2$ |
| Example 35 | 89 | | | | | 10 | 1 | | Ethyl formate | 0.1 | LiN(CF$_3$SO$_2$)$_2$ |
| Example 36 | 89 | | | | | 10 | 1 | | Ethyl formate | 1 | LiN(CF$_3$SO$_2$)$_2$ |
| Example 37 | 89 | | | | | 10 | 1 | | n-propyl formate | 1 | LiN(CF$_3$SO$_2$)$_2$ |
| Example 38 | 89 | | | | | 10 | 1 | | isopropyl formate | 1 | LiN(CF$_3$SO$_2$)$_2$ |
| Example 39 | 89 | | | | | 10 | 1 | | n-butyl formate | 1 | LiN(CF$_3$SO$_2$)$_2$ |
| Example 40 | 89 | | | | | 10 | 1 | | isobutyl formate | 1 | LiN(CF$_3$SO$_2$)$_2$ |
| Example 41 | 89 | | | | | 10 | 1 | | n-amyl formate | 1 | LiN(CF$_3$SO$_2$)$_2$ |
| Example 42 | 89 | | | | | 10 | 1 | | isoamyl formate | 1 | LiN(CF$_3$SO$_2$)$_2$ |
| Example 43 | 89 | | | | | 10 | 1 | | n-butyl formate | 0.01 | LiN(CF$_3$SO$_2$)$_2$ |
| Example 44 | 89 | | | | | 10 | 1 | | n-butyl formate | 5 | LiN(CF$_3$SO$_2$)$_2$ |

TABLE 3

| | Composition of nonaqueous solvent (vol. %) | | | | | | | | | |
|---|---|---|---|---|---|---|---|---|---|---|
| | Solvent of low boiling point | | | Solvent of high boiling point | | | Subsidiary component | | Added amount | |
| | | | | | | | | Kind of | | Kind of |
| | DME | DGM | DGE | TGM | DGB | TeGM | PC | EC | additive (mass %) | electrolyte |
| Comparative Example 1 | 100 | | | | | | | | | LiN(CF$_3$SO$_2$)$_2$ |
| Comparative Example 2 | | 100 | | | | | | | | LiN(CF$_3$SO$_2$)$_2$ |
| Comparative Example 3 | | | 100 | | | | | | | LiN(CF$_3$SO$_2$)$_2$ |
| Comparative Example 4 | | | | 100 | | | | | | LiN(CF$_3$SO$_2$)$_2$ |
| Comparative Example 5 | | | | | 100 | | | | | LiN(CF$_3$SO$_2$)$_2$ |
| Comparative Example 6 | | | | | | 100 | | | | LiN(CF$_3$SO$_2$)$_2$ |
| Comparative Example 7 | | | | | 50 | 50 | | | | LiN(CF$_3$SO$_2$)$_2$ |
| Comparative Example 8 | | 46.5 | | | | 46.5 | 7 | | | LiN(CF$_3$SO$_2$)$_2$ |
| Comparative Example 9 | | 45 | | | | 45 | 10 | | | LiN(CF$_3$SO$_2$)$_2$ |

The names of the compounds that are abbreviated in Tables 1 to 3 are as follows.

DME: 1,2-dimethoxyethane
DGM: diethylene glycol dimethyl ether
DGE: diethylene glycol diethyl ether
TGM: triethylene glycol dimethyl ether
DGB: diethylene glycol dibutyl ether
TeGM: tetraethylene glycol dimethyl ether
PC: propylene carbonate
EC: ethylene carbonate The concentration of the electrolytic salt is 0.75 M in Examples 33-44, and 1.0 M in the rest of Examples.

The following Experiments 1-4 were conducted using the cells of Examples 1-44 and Comparative Examples 1-9. These experiments aimed at studying the long-period stability in an environment of high temperature, reflow resistivity, and discharge characteristic after reflow of the cells prepared above in relation to the solvent composition of the nonaqueous electrolytic solution and an additive.

[Experiment 1]

Using the cells of Comparative Examples 1-6, a study was conducted on the reflow resistivity, and internal resistance (IR) after reflow of the cells in relation to the main solvent of the electrolytic solution.

<Reflow Resistance Test>

Each cell was put into a reflow furnace that was set such that the surface temperature of the cell was kept at 150° C. or higher for 230 seconds, 200° C. or higher for 90 seconds, and 250° C. or higher for 40 seconds (maximum: 260° C.), and a change in the entire length of each cell was examined.

<Measurement of Internal Resistance>

Internal resistance to an alternating current of 1 kHz was measured for each cell.

Figure 2:
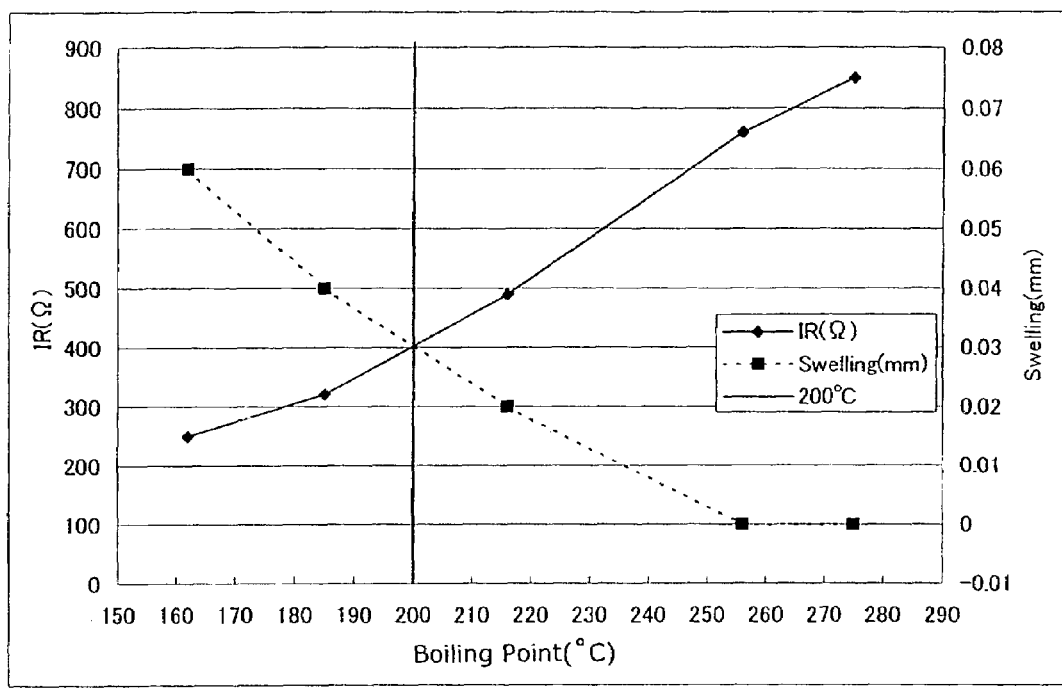
FIG. 2 is a graph showing the boiling point of an ether-based compound in relation to cell swelling and internal resistivity.

The results of Experiment 1 are shown in FIG. 2.
The boiling point of each solvent is as follows.
1,2-dimethoxyethane: 85° C.
diethylene glycol dimethyl ether: 162° C.
diethylene glycol diethyl ether: 185° C.
triethylene glycol dimethyl ether: 216° C.
diethylene glycol dibutyl ether: 256° C.
tetraethylene glycol dimethyl ether: 275° C.

From FIG. 2, such a tendency has been found that as the boiling point of the main solvent becomes higher, the swelling of the cell at the time of the reflow resistance test becomes smaller, and internal resistivity increases. From the results shown in this figure, it has been found that such a cell is preferable that has low internal resistivity realized by a solvent having a boiling point of lower than 200° C. and has low cell swelling realized by a solvent having a boiling point of higher than 200° C.

Note that the data of Comparative Example 1, in which 1,2-dimethoxyethane (DME) having a boiling point of 85° C. was used, is not shown in FIG. 2. The cell of Comparative Example 1 burst due to reflow, and thus it was impossible to measure its internal resistivity and swelling.

[Experiment 2]

Using the cells of Examples 1-17, and Comparative Example 1,2, 6, and 7, a study was conducted on the composition of a compound having a boiling point of higher than 200° C. and a compound having a boiling point of lower than 200° C. in a nonaqueous solvent of the electrolytic solution, in relation to the cell swelling, internal resistivity (IR), discharge capacity, high-rate (50 μA) discharge capacity, and low-temperature (−20° C.) discharge capacity of each cell after the reflow resistance test. As for the cell that burst at the time of the reflow resistance test, this experiment was not conducted.

The reflow resistance test and the measurement of internal resistivity were conducted in the same manner as Experiment 1, and discharge capacity, high-rate discharge capacity, and low-temperature discharge capacity were measured under the following conditions.

<Measurement of Discharge Capacity>

After subjected to the reflow resistance test, each cell was charged by applying them a uniform voltage of 3.0 V for 30 hours. Then, a discharging of 500 kΩ specific resistance was conducted and the discharge capacity of each cell was measured until cell voltage reached 2.0 V.

<Measurement of High-Rate Discharge Capacity>

After subjected to the reflow resistance test, each cell was charged by applying them a uniform voltage of 3.0 V for 30 hours. Then, a high-rate discharging of 50 μA was conducted and the discharge capacity of each cell was measured until cell voltage reached 2.0 V.

<Measurement of Low-Temperature Discharge Capacity>

After subjected to the reflow resistance test, each cell was charged by applying them a uniform voltage of 3.0 V for 30 hours. Then, a discharging of 500 kΩ specific resistance was conducted in an atmosphere of −20° C., and the discharge capacity of each cell was measured until cell voltage reached 2.0 V.

The results of Experiment 2 are shown in Table 4.

TABLE 4

| | IR (Ω) | Swelling (mm) | Discharge capacity (mAh) | 50 μA discharge capacity (mAh) | −20° C. discharge capacity (mAh) |
|---|---|---|---|---|---|
| Example 1 | 311 | 0.045 | 2.68 | 1.89 | 1.01 |
| Example 2 | 438 | 0.008 | 2.62 | 1.61 | 0.91 |
| Example 3 | 425 | 0.010 | 2.63 | 1.55 | 0.33 |
| Example 4 | 387 | 0.018 | 2.65 | 1.82 | 0.95 |
| Example 5 | 359 | 0.020 | 2.63 | 1.78 | 0.94 |
| Example 6 | 422 | 0.002 | 2.64 | 1.65 | 0.89 |
| Example 7 | 446 | 0.005 | 2.62 | 1.63 | 0.92 |
| Example 8 | 419 | 0.007 | 2.61 | 1.61 | 0.92 |
| Example 9 | 383 | 0.015 | 2.67 | 1.71 | 0.97 |
| Example 10 | 501 | 0.005 | 2.61 | 1.58 | 0.96 |
| Example 11 | 742 | 0.032 | 2.41 | 1.03 | 0.03 |
| Example 12 | 1033 | 0.035 | 2.36 | 0.98 | 0.03 |
| Example 13 | 302 | 0.050 | 2.67 | 1.91 | 1.08 |
| Example 14 | 724 | 0.152 | 1.99 | 1.26 | 0.52 |
| Example 15 | 687 | 0.000 | 2.58 | 1.47 | 0.11 |
| Example 16 | 407 | 0.011 | 2.62 | 1.63 | 0.95 |
| Example 17 | 359 | 0.036 | 2.66 | 1.75 | 0.98 |
| Comparative Example 1 | — | burst | — | — | — |
| Comparative Example 2 | 266 | 0.061 | 2.71 | 1.90 | 1.00 |
| Comparative Example 6 | 842 | 0.000 | 2.52 | 1.34 | 0.07 |
| Comparative Example 7 | 826 | 0.000 | 2.49 | 1.39 | 0.08 |

It has been found from Table 4 above that a cell having such excellent characteristics as an internal resistivity of 446Ω or lower, a cell swelling of 0.045 mm or lower, a discharge capacity of 2.61 mAh or higher, a high-rate discharge capacity of 1.55 mAh or higher, and a low-temperature discharge capacity of 0.33 mAh or higher is obtained each in Examples 1-9, where such a nonaqueous electrolyte was used that LiN (CF$_3$SO$_2$)$_2$ was dissolved in a solvent having a mixture of, among compounds represented by the following general formula (1), a compound (hereinafter referred to as a low boiling point compound) having a boiling point of lower than 200° C. and, among compounds represented by the following general formula (1), a compound (hereinafter referred to as a high boiling point compound) having a boiling point of higher than 200° C. at a volume mixture ratio of 1:1 (23° C.).

On the other hand, in Comparative Examples 1 and 2, where such a nonaqueous electrolyte was used that LiN (CF$_3$SO$_2$)$_2$ was dissolved only in a low boiling point compound, the swelling of the cell was 0.061 mm or it burst. In Comparative Examples 6 and 7, where such a nonaqueous electrolyte was used that LiN (CF$_3$SO$_2$)$_2$ was dissolved only in a high boiling point compound, high-rate discharge capacity was 1.39 mAh or lower, and low-temperature discharge capacity was 0.08 mAh or lower. Thus, in the above Comparative Examples, it has been found that cell characteristics are inferior.

$$X-(O-C_2H_4)n-O-Y \quad (1)$$

(where X and Y are independently an alkyl group (number of carbons: 1-4), and n is 1-5)

This is considered as follows. A low boiling point compound has high chemical stability and has relatively low viscosity. Therefore, when this solvent is included in an electrolytic solution, internal cell resistivity decreases, making it possible to improve cell characteristics. However, the above compound has a boiling point of lower than 200° C., and at the time of a reflow resistance test, where a cell is temporarily exposed to a temperature of 260° C., the solvent may cause an increase in internal cell pressure and the swelling of the cell. However, a high boiling point compound included in the nonaqueous solvent is, although having high viscosity, excellent in heat stability, and thus operates to alleviate an increase in internal cell pressure at the time of the reflow resistance test, which increase results from the low boiling point compound. As a result, the swelling of the cell is rendered small. Thus, a lithium cell excellent in heat resistant safety and an excellent discharge characteristic was realized.

On the other hand, when a low boiling point compound was used alone, the effect to alleviate an increase in internal cell pressure at the time of the reflow resistance test was not obtained, since such effect is due to the mixture of a high boiling point compound. Accordingly, it is considered that the cell swelled on a large scale, and in Comparative Example 1, where 1,2-dimethoxyethane (DME) having a boiling point of as low as 85° C. was used, the cell burst. When a high boiling point compound was used alone, since the viscosity of the high boiling point compound itself was high, the conductivity of an lithium ion in the electrolytic solution is rendered small. Accordingly, it is considered that especially under the conditions of high-rate discharging and low-temperature discharging, cell characteristics became inferior.

From the results of Examples 2, and 10-12, where the solvent composition was identical and the kind of the electrolytic salt was changed, it has been found that in Examples 2 and 10, where an imide-based electrolytic salt (LiN (CF$_3$SO$_2$)$_2$, LiN (C$_2$F$_5$SO$_2$)$_2$) was used, low-temperature (−20° C.) discharge capacity was 0.91 mAh or higher, while in Examples 11 and 12, where a perfluoro-acid-based electrolytic salt (LiPF$_6$, LiBF$_4$) was used, low-temperature discharge capacity was as extremely low as 0.03 mAh.

This is considered as follows. The imide-based electrolytic salt has high heat stability and thus the electrolytic solution does not deteriorate after the reflow resistance test. On the other hand, the perfluoro-acid-based electrolytic salt has low heat stability and thus the electrolytic solution deteriorates remarkably after the reflow resistance test. The deterioration of the electrolytic solution seriously affects discharge capacity under a low temperature, which is considered to be responsible for the results shown in Table 4.

From the results of Examples 1, 13, and 14, where the electrolytic salt was identical and 1,2-dimethoxyethane (DME) was used as a low boiling point compound and tetraethylene glycol dimethyl ether (TeGM) was used as a high boiling point compound, and the mixture ratio of the low boiling point compound and high boiling point compound was changed, it has been found that in the cells (Examples 1 and 13) in which the volume mixture ratio of DME was in the range of 50 to 60 percent, the swelling of each cell was as low as 0.050 mm or lower, and cell characteristics were excellent. On the other hand, in the cell of Example 14, where the volume mixture ratio of DME was 70 percent, the swelling of each cell was as high as 0.150 mm, and cell characteristics deteriorated on a large scale.

This is considered as follows. The critical temperature of 1,2-dimethoxyethane (DME) is 258° C., and thus causes to remarkably increase internal cell pressure in the reflow resistance test, where the temperature temporarily reaches 260° C. When the volume mixture ratio of DME was 60 percent or lower, because of the effect to alleviate an increase in internal cell pressure realized by the mixed high boiling point compound (in Examples, tetraethylene glycol dimethyl ether), the swelling of the cell was restricted to 0.050 mm or lower. On the other hand, when the volume mixture ratio of DME was higher than 60 percent, because the effect to alleviate an increase in internal cell pressure realized by the mixed high boiling point compound became small, the swelling of the cell became as high as 0.150 mm. In addition, it is considered that the swelling of the cell decreased the adhesion properties of the active material, thus deteriorating cell characteristics.

From the results of Examples 2-5 and 15-17, where the electrolytic salt was identical and a solvent other than 1,2-dimethoxyethane (DME) was used as a low boiling point compound and tetraethylene glycol dimethyl ether (TeGM) was used as a high boiling point compound, and only the mixture ratio of the low boiling point compound and high boiling point compound was changed, it has been found that in the cells (Examples 2-5, 16 and 17) in which the mixture ratio of the low boiling point compound was in the range of 50 to 90 percent, a low-temperature characteristic was as excellent as 0.33 mAh or higher, while in Example 15, where the mixture ratio of the low boiling point compound was 30 percent, a low-temperature characteristic was as extremely low as 0.11 mAh.

This is considered as follows. Since the low boiling point compound included a compound having a higher boiling point and a higher critical temperature than those of 1,2-dimethoxyethane (DME), the increase of internal cell pressure was smaller at the time of the reflow resistance test, where the temperature temporarily reaches 260° C., than when only DME was used as a low boiling point compound. Accordingly, even though the volume mixture ratio of the low boiling point compound was 90 percent, because of the effect to alleviate an increase in internal cell pressure realized by the mixed high boiling point compound (in Examples, tetraethylene glycol dimethyl ether), the swelling of the cell was restricted to 0.036 mm or lower. On the other hand, when the volume mixture ratio of the low boiling point compound was 50 percent or lower, because the mixed high boiling point compound was excessive, the viscosity of the electrolytic solution increased. Accordingly, it is considered that especially under the condition of low-temperature, discharge capacity became inferior.

[Experiment 3]

Using the cells of Examples 2, 18-21, and Comparative Example 8 and 9, a study was conducted on the composition of a compound having a boiling point of higher than 200° C. and a compound having a boiling point of lower than 200° C. in a nonaqueous solvent of the electrolytic solution, in relation to the cell swelling, internal resistivity, discharge capacity, high-rate discharge capacity, low-temperature discharge capacity, and cycle characteristic of each cell after the reflow resistance test.

The reflow resistance test, the measurement of internal resistivity, discharge capacity, high-rate discharge capacity, and low-temperature discharge capacity were conducted in the same manner as Experiment 1 or 2, and a cycle characteristic was measured under the following conditions.

<Measurement of Cycle Characteristic>

After subjected to the reflow resistance test, each cell was charged by applying them a uniform voltage of 3.0 V for 30 hours. Then, a discharging was conducted at a specific resistance of 500 kΩ until cell voltage reacted 2.0 V, and the number of cycles where a discharge characteristic was 50 percent of that of the first cycle was measured.

The results of Experiment 3 are shown in Table 5.

TABLE 5

|  | IR (Ω) | Swelling (mm) | Discharge capacity (mAh) | 50 μA discharge capacity (mAh) | −20° C. discharge capacity (mAh) | Cycle characteristic (number) |
| --- | --- | --- | --- | --- | --- | --- |
| Example 2 | 438 | 0.008 | 2.62 | 1.61 | 0.91 | 15 times |
| Example 18 | 547 | 0.003 | 2.57 | 0.87 | 0.76 | 17 times |
| Example 19 | 707 | 0.005 | 2.49 | 0.77 | 0.60 | 19 times |
| Example 20 | 921 | 0.001 | 2.41 | 0.59 | 0.38 | 20 times |
| Example 21 | 695 | 0.000 | 2.51 | 0.78 | 0.59 | 19 times |
| Comparative Example 8 | 1733 | 0.007 | 2.42 | 0.11 | 0.05 | 24 times |
| Comparative Example 9 | 1908 | 0.008 | 2.35 | 0.10 | 0.01 | 25 times |

From Table 5 above, such a tendency has been found that as the added amount of a subsidiary component (cyclic carbonate) increases, a cycle characteristic becomes better, as well as an increase in internal resistivity and a decrease in high-rate discharge capacity and low-temperature discharge capacity. It has been found that when the added amount of a subsidiary component was 5 volume percent or lower, internal resistivity increased and a decrease in high-rate discharge capacity and low-temperature discharge capacity was minimized, thus realizing a cell having a good cycle characteristic. When the added amount of a subsidiary component was higher than 5 volume percent, internal resistivity became 1733Ω or higher, and high-rate discharge capacity became 0.11 mAh or lower and low-temperature discharge capacity became 0.05 mAh or lower. Thus, cell characteristics deteriorated remarkably.

This is considered as follows. Cyclic carbonate, used as a subsidiary component, has high stability to high temperature and has a higher relative dielectric constant than an ether compound, which is a main solvent, and thus operates to improve a cycle characteristic. However, cyclic carbonate is highly reactive to the negative electrode and thus forms a highly resistant coating film on the surface of the negative electrode. This increases internal resistivity, and thus degrades cell characteristics. When the added amount of cyclic carbonate is 5 volume percent or lower, such a cell is obtained that internal resistivity increases, a decrease in high-rate discharge capacity and low-temperature discharge capacity is minimized, and a cycle characteristic is satisfactory, which is preferable.

[Experiment 4]

Using the cells of Examples 2, 18, and 22-32, a study was conducted on the kind of an additive and the added amount thereof, in relation to the cell swelling, internal resistivity, discharge capacity, high-rate discharge capacity, low-temperature discharge capacity, and cycle characteristic of each cell after the reflow resistance test. The reflow resistance test, the measurement of internal resistivity, discharge capacity, high-rate discharge capacity, and low-temperature discharge capacity were conducted in the same manner as Experiment 1 or 2.

TABLE 6

|  | IR ($\Omega$) | Swelling (mm) | Discharge capacity (mAh) | 50 µA discharge capacity (mAh) | −20° C. discharge capacity (mAh) |
|---|---|---|---|---|---|
| Example 2 | 438 | 0.008 | 2.62 | 1.61 | 0.91 |
| Example 18 | 547 | 0.003 | 2.57 | 0.87 | 0.76 |
| Example 22 | 459 | 0.011 | 2.58 | 0.87 | 0.76 |
| Example 23 | 420 | 0.025 | 2.49 | 0.81 | 0.68 |
| Example 24 | 373 | 0.041 | 2.45 | 0.78 | 0.69 |
| Example 25 | 351 | 0.061 | 2.41 | 0.75 | 0.65 |
| Example 26 | 384 | 0.087 | 2.38 | 0.71 | 0.59 |
| Example 27 | 411 | 0.027 | 2.53 | 0.85 | 0.75 |
| Example 28 | 405 | 0.032 | 2.51 | 0.83 | 0.71 |
| Example 29 | 382 | 0.031 | 2.55 | 0.88 | 0.78 |
| Example 30 | 391 | 0.028 | 2.50 | 0.85 | 0.75 |
| Example 31 | 401 | 0.022 | 2.51 | 0.82 | 0.72 |
| Example 32 | 415 | 0.030 | 2.48 | 0.77 | 0.66 |

From Table 6 above, such a tendency has been found that as the added amount of ethyl formate increases, internal resistivity decreases and the swelling of the cell increases (Examples 22-26). It has been found that when the added amount of an additive was 5 mass percent or lower, such a cell is obtained that the swelling of the cell was minimized and internal resistivity was low. When the added amount of an additive was 5 mass percent or higher, high-rate discharge capacity became 0.75 mAh or lower and low-temperature discharge capacity became 0.65 mAh or lower. Thus, cell characteristics deteriorated remarkably.

This is considered as follows. Carboxylic acid, carboxylic acid ester, and carboxylic acid anhydride (carboxylic acids and the like), used as additives, form a highly conductive coating film on the surface of the negative electrode, and thus are able to inhibit the reaction of an ether-based compound, which is a main solvent, or propylene carbonate to the negative electrode. Accordingly, such carboxylic acids and the like operate to reduce internal resistivity. However, carboxylic acids and the like react to a manganese compound included in the positive electrode because of reflow, and thus decompose to generate a gas. This increases internal cell pressure and causes the swelling of the cell. When the added amount of carboxylic acids is 0.01 to 5 mass percent, such a cell is obtained that the swelling of the cell is minimized and internal resistivity is low.

[Experiment 5]

Using the cells of Examples 33-44, a study was conducted on an additive in relation to the pulse discharge characteristic before reflow, internal cell resistivity and pulse discharge characteristic after the reflow resistance test of each cell. The reflow resistance test and the measurement of internal resistivity were conducted in the same manner as Experiment 1.

<Pulse Discharge Test>

A pulse discharging was conducted for 0.29 seconds at a specific resistance of 3.6 k$\Omega$. Here, the lowest voltage was rendered pulse discharge voltage.

TABLE 7

|  | Before reflow | | After reflow | |
|---|---|---|---|---|
|  | Pulse discharge voltage (V) | Internal resistivity ($\Omega$) | Pulse discharge voltage (V) | Internal resistivity ($\Omega$) |
| Example 33 | 2.24 | 122 | 1.44 | 920 |
| Example 34 | 2.28 | 95 | 1.63 | 415 |
| Example 35 | 2.30 | 109 | 1.94 | 309 |
| Example 36 | 2.31 | 106 | 1.99 | 296 |
| Example 37 | 2.31 | 104 | 2.00 | 291 |
| Example 38 | 2.29 | 108 | 1.95 | 301 |
| Example 39 | 2.33 | 101 | 2.05 | 283 |
| Example 40 | 2.29 | 107 | 2.01 | 295 |
| Example 41 | 2.29 | 104 | 2.03 | 289 |
| Example 42 | 2.28 | 109 | 1.94 | 302 |
| Example 43 | 2.28 | 108 | 1.98 | 297 |
| Example 44 | 2.31 | 102 | 2.04 | 285 |

It has been found from Table 7 that in Examples 34-44, where an additive (carboxylic acids and the like) was added, pulse discharge voltage after reflow was 1.63 to 2.05 V and internal resistivity was 283 to 415$\Omega$, that is, these results were much superior to Example 33, where no additive was added and pulse discharge voltage after reflow was 1.44 V and internal resistivity was 920$\Omega$.

This is considered as follows. Carboxylic acid ester, used as an additive, forms a highly conductive coating film on the surface of the negative electrode, and thus is able to inhibit the reaction of an ether-based compound, which is a main solvent, or propylene carbonate to the negative electrode. Accordingly, such carboxylic acid ester operates to reduce internal resistivity. It is considered that the decrease of internal resistivity caused to improve a pulse discharge characteristic.

It has been found from a comparison between Examples 39, 43, and 44, where the added amount of n-butyl formate serving as an additive was changed, that when the added amount was in the range of 0.01 to 5 mass percent, pulse discharge voltage after reflow was 1.98 to 2.05 V, that is, there was no major difference in pulse discharge voltage after reflow. Accordingly, when the added amount of n-butyl formate is in the range of 0.01 to 5 mass percent, pulse discharge voltage after reflow improves sufficiently.

It has been found from Experiments 4 and 5 that when the compound ratio of a low boiling point compound is high, the effect to improve cell characteristics realized by the addition of carboxylic acids is exhibited remarkably, although the reason has not been detected.

[Supplementary Remarks]

(1) Carboxylic acids include carboxylic acid such as formic acid, acetic acid, propionic acid, oxalic acid, maleic acid, benzoic acid, phthalic acid, metaphthalic acid, and terephthalic acid; carboxylic acid ester (excluding lactone) such as methyl formate, ethyl formate, n-propyl formate, isopropyl formate, n-butyl formate, isobutyl formate, amyl formate, isoamyl formate, methyl acetate, ethyl acetate, and methyl propionate; and carboxylic acid anhydride such as acetic anhydride and phthalic anhydride. The use of the foregoing realizes a similar advantageous effect.

However, if a large amount of carboxylic acids and the like is added in the electrolytic solution, carboxylic acids, upon exposure to a condition of high temperature such as reflow, react to a manganese compound included in the positive electrode, and thus generate a gas. This may cause the swelling of the cell. In view of this, the added amount of carboxylic acids and the like is preferably 0.01 to 5 pts. mass per 100 pts. mass of the electrolytic solution.

To obtain the effect of carboxylic acids and the like sufficiently, the composition amount of a low boiling point compound is preferably 50 percent or higher, more preferably 60 percent or higher, and further more preferably 70 percent or higher.

(2) In the above Examples, although ethylene carbonate and propylene carbonate was used as a subsidiary component, other cyclic carbonates such as butylene carbonate and vinylene carbonate, or lactone such as γ-butyrolactone may be used. Alternatively, a mixture of the foregoing may be used.

(3) The application of the present invention is not limited to lithium secondary cells such as those described in the above examples; it is applicable to any lithium cells such as lithium primary cells, where similar excellent effects are obtained.

(4) When the present invention is applied to lithium secondary cells, it is preferable to use spinel type lithium manganese oxide (LiMn$_2$O$_4$) as a positive-electrode active material because it is low cost and has high heat stability. It is also possible, however, to use other lithium-containing transition metal oxides such as lithium-containing cobalt oxide (LiCoO$_2$), lithium-containing nickel oxide (LiNiO$_2$), and lithium-containing iron oxide (LiFeO$_2$), or a mixture thereof. It is also possible to use lithium-containing transition metal oxides that have in the crystal lattice thereof other metal elements.

As for a negative-electrode active material, it is preferable to use metal or the like that metalizes with lithium metal, lithium alloy, and lithium.

(5) When lithium metal or lithium alloy is used for the negative electrode, metal oxide such as manganese dioxide and diniobium pentoxide that does not contain lithium and intercalates and releases a lithium ion may be used. Such metal oxide may be used alone or along with boron oxide contained therein.

(6) When the present invention is applied to lithium primary cells, manganese dioxide, graphite fluoride, iron disulfide, iron sulfide, or the like may be used as a positive-electrode active material. Manganese dioxide is preferable in terms of heat stability.

As for a negative-electrode active material, it is preferable to use lithium metal, lithium alloy, or the like.

(7) As for an electrolytic salt, it is preferable to use imide-based lithium salt in terms of heat stability. However, a small amount of lithium salt other than the above may be included.

(8) The cell of the present invention endures over a long period of use in a severe environment of high temperature. For that purpose, the separator should be made of a material that has a heat-resistant temperature (melting/decomposition temperature) of preferably over 150° C., more preferably over the melting temperature of reflow soldering (185° C.), particularly preferably over the lowest reflow temperature (200° C.), and most preferably over the highest reflow temperature (260° C.).

The above materials for a separator include, other than the aforementioned polyphenylene sulfide and polyether etherketone, heat resistant resins such as polyether ketone, polybutylene terephthalate, and cellulose, or resins whose heat resistance temperatures are enhanced by adding a filler such as glass fiber in the resin materials.

(9) In the above Examples, in sealing the opening portion of the cell outer housing can, caulking with the use of a gasket was used. However, instead of this technique, laser radiation or the technique of heating and depositing a sealing member made of heat resistant resin may be used.

When a gasket or heat resistant resin is used for sealing the cell, in terms of the heat resistant reliability (prevention of leakage) of the cell, the material of the gasket or heat resistant resin desirably satisfies the heat-resistant temperature conditions for the material of the separator.

As has been described above, the present invention realizes a lithium cell that is used safely for a long period of time in a high temperature environment of 100 to 150° C. and that inhibits the deterioration of discharging performance even in such environment of high temperature. Since such cell of the present invention has excellent heat resistant safety and an excellent discharge characteristic, when the cell is constructed, it is possible to employ the technique of reflow soldering, which entails a high temperature of 200 to 260° C., although such high temperature is required as temporarily as 100 seconds. In this case as well, upon exposure to reflow heating, there is no swelling of the cell or deterioration of cell performance.

What is claimed is:

1. A lithium cell comprising:
a positive electrode;
a negative electrode;
a separator interposed between the positive electrode and the negative electrode; and
a nonaqueous electrolyte including a nonaqueous solvent and an electrolytic salt, wherein:
the nonaqueous solvent includes: among compounds represented by the following general formula (1), at least one compound having a boiling point of 200° C. or higher; and among compounds represented by the following general formula (1), at least one compound having a boiling point of lower than 200° C.; and
a total volume ratio at 23° C. of the compounds represented by the following general formula (1) is 95 to 100 percent of the nonaqueous solvent;
the compound having a boiling point of lower than 200° C. includes 1,2-dimethoxyethane; and
a volume ratio of the compound having a boiling point of lower than 200° C. is 50 to 60 percent of a total volume at 23° C. of the compounds represented by the following general formula (1), X—(O—C$_2$H$_4$)n-O—Y　　(1)

(where X and Y are independently an alkyl group (number of carbons: 1-4), and n is 1-5).

2. The lithium cell according to claim 1, wherein the nonaqueous solvent includes cyclic ester carbonate and/or lactone, the cyclic ester carbonate and/or lactone being a subsidiary component of the nonaqueous solvent and having a volume of 5 percent or lower of the total volume of the nonaqueous solvent at 23° C.

3. The lithium cell according to claim 1, wherein the electrolytic salt is lithium bis(trifluoromethanesulfonyl) imide and/or lithium bis(pentafluoroethanesulfonyl)imide.

4. The lithium cell according to claim 1, wherein the nonaqueous electrolyte includes at least one compound selected from the group consisting of carboxylic acid, carboxylic acid ester, and carboxylic acid anhydride at 0.01 to 5 parts by mass in total per 100 parts by mass of the nonaqueous solvent, the carboxylic acid ester excluding lactone.

5. A lithium cell comprising:
a positive electrode;
a negative electrode;
a separator interposed between the positive electrode and the negative electrode; and
a nonaqueous electrolyte including a nonaqueous solvent and an electrolytic salt, wherein:
the nonaqueous solvent includes: among compounds represented by the following general formula (1), at least one compound having a boiling point of 200° C. or higher; and among compounds represented by the following general formula (1), at least one compound having a boiling point of lower than 200° C.; and
a total volume ratio at 23° C. of the compounds represented by the following general formula (1) is 95 to 100 percent of the nonaqueous solvent;
the compound having a boiling point of lower than 200° C. is a compound other than 1,2-dimethoxyethane; and
a volume ratio of the compound having a boiling point of lower than 200° C. is 50 to 90 percent of a total volume at 23° C. of the compounds represented by the following general formula (1), $$X\text{—}(O\text{—}C_2H_4)_n\text{-}O\text{—}Y \tag{1}$$

(where X and Y are independently an alkyl group (number of carbons: 1-4), and n is 1-5).

6. The lithium cell according to claim 5, wherein the electrolytic salt is lithium bis(trifluoromethanesulfonyl)imide and/or lithium bis(pentafluoroethanesulfonyl)imide.

7. The lithium cell according to claim 5, wherein the nonaqueous electrolyte includes at least one compound selected from the group consisting of carboxylic acid, carboxylic acid ester, and carboxylic acid anhydride at 0.01 to 5 parts by mass in total per 100 parts by mass of the nonaqueous solvent, the carboxylic acid ester excluding lactone.

8. The lithium cell according to claim 5, wherein the nonaqueous solvent includes cyclic ester carbonate and/or lactone, the cyclic ester carbonate and/or lactone being a subsidiary component of the nonaqueous solvent and having a volume of 5 percent or lower of the total volume of the nonaqueous solvent at 23° C.

* * * * *